(12) United States Patent
Codilian et al.

(10) Patent No.: US 7,088,538 B1
(45) Date of Patent: Aug. 8, 2006

(54) ADAPTIVELY ESTIMATING A READ ACCESS TIME TO A SECOND TRACK BASED UPON THE BINNED RADIAL POSITION OF THE SECOND TRACK WITHIN A ROTATING MEDIA STORAGE DEVICE

(75) Inventors: Raffi Codilian, Irvine, CA (US); Gregory B. Thelin, Garden Grove, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 672 days.

(21) Appl. No.: 10/210,554

(22) Filed: Jul. 31, 2002

(51) Int. Cl.
*G11B 15/18* (2006.01)
(52) U.S. Cl. .................................................. 360/69
(58) Field of Classification Search ................ 360/69; 710/40, 112, 167; 711/113
See application file for complete search history.

(56) References Cited

U.S. PATENT DOCUMENTS

| 6,604,178 B1 * | 8/2003 | Hall ............................ 711/167 |
| 6,782,449 B1 * | 8/2004 | Codilian et al. ............ 711/113 |
| 2002/0186492 A1 * | 12/2002 | Smith .......................... 360/69 |

\* cited by examiner

*Primary Examiner*—Hoa T. Nguyen
*Assistant Examiner*—Mitchell Slavitt
(74) *Attorney, Agent, or Firm*—Blakely, Sokoloff, Taylor & Zafman

(57) ABSTRACT

A rotating media storage device (RMSD) to adaptively estimate a read access time to a second track based on the radial position of the second track is disclosed. The RMSD includes a disk having at least a first track and a second track and a microprocessor for controlling operations in the RMSD including seek operations. During a seek operation, the microprocessor bins a radial position of the second track and estimates a read access time to the second track based on the binned radial position of the second track.

27 Claims, 10 Drawing Sheets

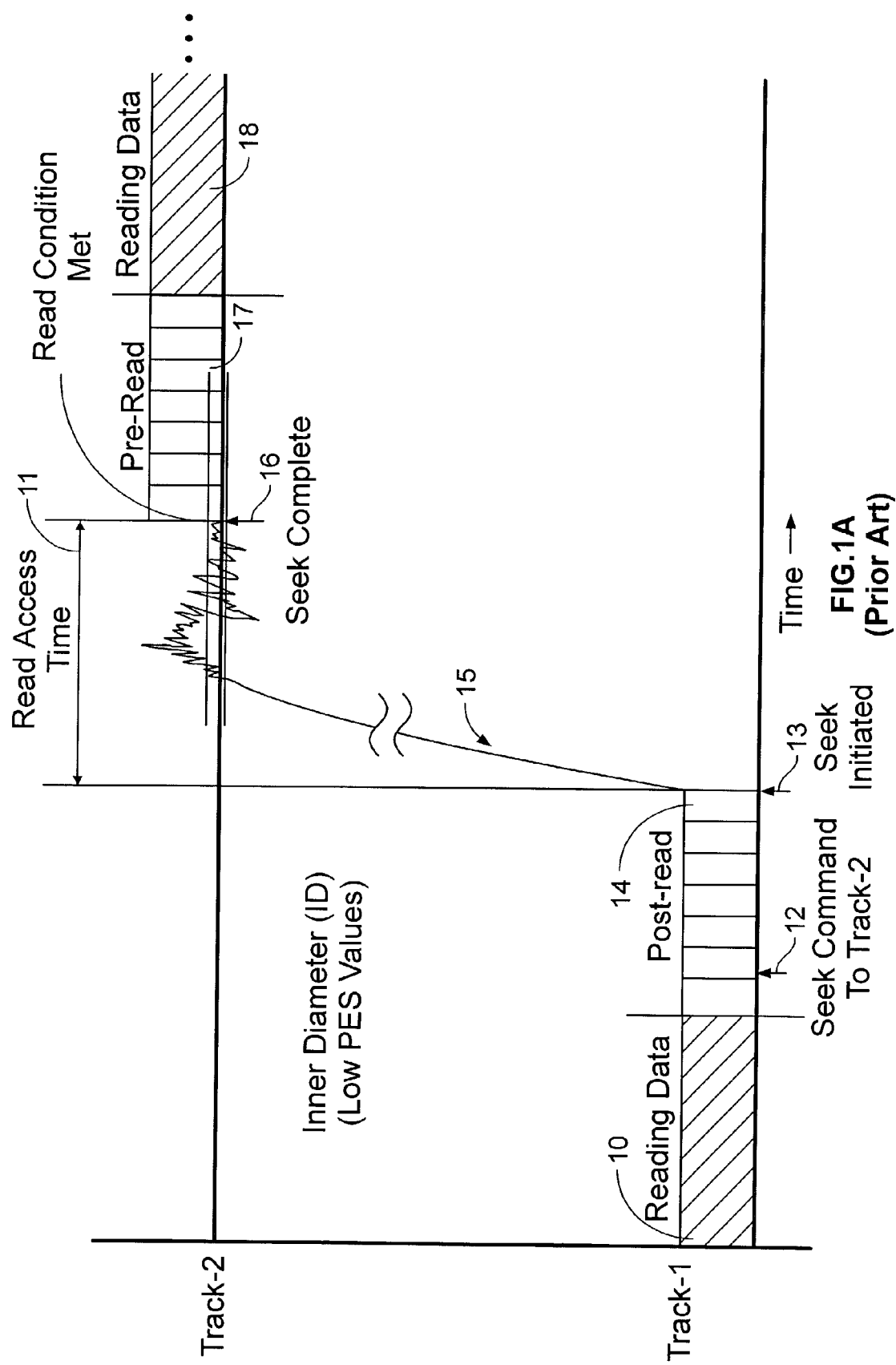

ADAPTIVELY ESTIMATING A READ ACCESS TIME TO A SECOND TRACK BASED UPON THE BINNED RADIAL POSITION OF THE SECOND TRACK WITHIN A ROTATING MEDIA STORAGE DEVICE

BACKGROUND OF THE INVENTION

1 Field of the Invention

The present invention relates to rotating media storage devices (RMSDs). More particularly, the present invention relates to an RMSD that adaptively estimates a read access time to a second track based on a binned radial position of the second track in order to optimize data transfer rates to and from a media.

2. Description of the Prior Art and Related Information

Computer systems rely on rotating media storage devices (RMSDs), which often employ a moveable head actuator to frequently access large amounts of data stored on the media. One example of an RMSD is a hard disk drive. One critical aspect of designing a RMSD in an extremely competitive market is its performance, typically measured by benchmark programs. The benchmark programs measure, among other things, the time required to perform a series of data transfer commands such as read commands. The time required to execute a given command is dependent on several factors including mechanical latency, cache size, and the efficiency of cache management.

One key aspect of mechanical latency in a RMSD is media rotational speed. In a competitive environment, products such as disk drives at a comparable price point offer comparable rotational speeds. Another aspect of mechanical latency is seek time, which generally measures the time required to move a head actuator from a current position to a target position. The seek time is determined by the mechanical characteristics of the head actuator, sometimes termed head stack assembly, and a seek profile which defines, during the time the actuator is accelerated and decelerated en route to the target position, an instantaneous desired velocity or acceleration/deceleration designed to achieve an efficient and predictable arrival of the head supported by the actuator over the target position on the media. Disk drive makers work diligently to improve the mechanics of the head stack assembly and the seek profile used to manage the seek operation. Nevertheless, disk drives at comparable price points tend to exhibit similar seek time characteristics.

In an effort to overcome limitations imposed by mechanical latency, disk drives have employed cache memory to reduce command execution time by providing host computer requested data from a cache memory, rather than from the disk directly. This technique is useful because oftentimes requested data is data that is repetitive or sequential with previously requested data. The disk drive, having anticipated such requests, is able to furnish data from a semiconductor memory and thus avoids mechanical latency. The process of reading data which is sequential with host requested data may involve reading data which precedes the host-requested data (pre-read) and data which follows the host-requested data (post-read). Utilizing these types of read caching algorithms improves data throughput.

Today, most RMSDs utilize a read access time to allocate the amount of time it should take to seek from a first track and to settle on a second track in order to start reading data from the second track. Typically, these read access times include periods of time for performing post-read operations on the first track and pre-read operations on the second track. Usually these read access times are looked up from a look up table and are based merely on the absolute distance from the first track to the second track and rotational latency.

Unfortunately, sometimes the read access time is not of sufficient length to complete the seek and settle operation to the second track. When this occurs, the RMSD must perform another revolution of the disk to capture the missed data resulting in an entirely wasted revolution of the disk and seriously degrading the data transfer rate of the RMSD. This often occurs when the second track is an outer diameter track. One of the reasons for why his happens is because when the head of the RMSD moves to an outer diameter track of a rotating disk there are sources present there that generate increased Position Error Signal (PES) values (e.g. due to vibration) and as a result high PES values are present. Thus, it takes longer to settle on an outer diameter track. This variable is not taken into account in the read access time. Moreover, oftentimes increased PES values occur at outer diameter tracks of the disk due to imperfections, which were written into the outer diameter tracks during the servo writing process.

Looking at FIG. 1A, an example of a seek and settle operation for an RMSD with a read access time and a standard read caching algorithm is illustrated. Data 10 is read along Track-1 and a seek command to Track-2 (e.g. an inner diameter track) to read data is received at point 12. Consequent to this event, the time to seek to the second track is calculated as the read access time 11. The read caching algorithm typically performs a post-read 14 along Track-1 and then a seek is initiated at point 13. Line 15 illustrates the movable head of the RMSD moving from Track-1 to Track-2. Particularly, as line 15 illustrates, the movable head seeks and settles to Track-2. A read condition is then met when the seek and settle operation is complete and an on-track condition is declared at point 16. The read caching algorithm causes a pre-read 17 on Track-2 and then further proceeds to read the desired data 18. As previously discussed, by performing the post-read 14 and further the pre-read 17, and reading this data into semiconductor memory, the overall data transfer rate can be improved. However, this only holds true as long as the moveable head seeks and settles to the second track within the read access time 11.

On the other hand, as shown FIG. 1B, another example of a seek and settle operation with a read access time and a standard read caching algorithm for an RMSD is illustrated. In this case the moveable head of the RMSD is moving from a first track to an outer diameter track. Here, data 20 is read along Track-1 and a seek command to Track-2 to read data is received at point 22. Consequent to this event, a read access time 11 to seek and settle to the second track is calculated. The read caching algorithm typically performs a post-read 24 along Track-1 and a seek is initiated at point 23 based on the read access time 11. Line 25 illustrates the movable head of the RMSD moving form Track-1 to Track-2. In particular, as line 25 illustrates, due to the inherent sources that generate increased PES values (e.g. due to vibration) at an outer diameter track, the resulting PES values at the outer diameter Track-2 are high, as previously discussed, and the moveable head takes considerably longer to seek and settle to Track-2, as opposed to the seek and settle operation of FIG. 1A to an inner diameter track.

Particularly, as shown in FIG. 1B, the movable head does not settle to the outer diameter Track-2 until point 16 (at which point reading can begin). Thus, the moveable head does not settle on the intended pre-read portion 17. Unfortunately, the pre-read portion 17 and missed data 18 still need to be read and the disk of the RMSD must perform another revolution to capture the missed data. This results in an entirely wasted revolution of the disk and seriously degrades the data transfer rate of the RMSD.

SUMMARY OF THE INVENTION

The present invention relates to adaptively estimating a read access time to a second track based on the radial position of the second track within a rotating media storage device (RMSD) to optimize data transfer rates to and from a media.

In one aspect, the invention may be regarded as a RMSD connected to a host computer. The RMSD includes a disk having at least a first track and a second track, a moveable head, a cache memory and a microprocessor for controlling operations in the RMSD including seek operations and read caching algorithms for read operations that include pre-read operations and post-read operations. The microprocessor under the control of a program bins a radial position of the second track and estimates a read access time to the second track based on the binned radial position of the second track and the distance between the first track and second track.

In one embodiment, the step of binning may include grouping outer diameter track bands and inner diameter track bands. The outer diameter track bands and the inner diameter track bands may be either uniform or non-uniform. In a even more detailed embodiment, the read-caching algorithm may be modified based on the estimated read access time. Further, modifying the read caching algorithm may also include adjusting the amount of post-read performed on the first track. For example, the amount of post-read performed on the first track is decreased if the second track belongs to an outer diameter track band. On the other hand, the amount of post-read performed on the first track is increased if the second track belongs to an inner diameter track band. Moreover, the amount of post-read performed on the first track may be inversely proportional to the binned radial position of the second track.

In another aspect, the invention may be regarded as a method for an RMSD to efficiently switch between a read operation on a first track of a disk and a read operation on a second track. The method comprises the steps of: binning a radial position of the second track and estimating a read access time to the second track based on the binned radial position of the second track and the distance between the first track and the second track.

In yet another aspect, the invention may be regarded as a computer system including a host computer and an RMSD, in which the RMSD further comprises a disk including at least a first track and a second track, a moveable head, a cache memory, and a microprocessor for controlling operations in the RMSD including seek operations and read caching algorithms for read operations that include pre-read operations and post-read operations. The microprocessor under the control of a program bins a radial position of the second track and estimates a read access time to the second track based on the binned radial position of the second track and the distance between the first track and the second track.

The foregoing and other features of the invention are described in detail below and set forth in the appended claims.

BRIEF DESCRIPTION OF THE DRAWINGS

FIG. 1A is an example of a seek and settle operation for an RMSD with a read access time and a standard read caching algorithm.

DETAILED DESCRIPTION

Figure 1B:
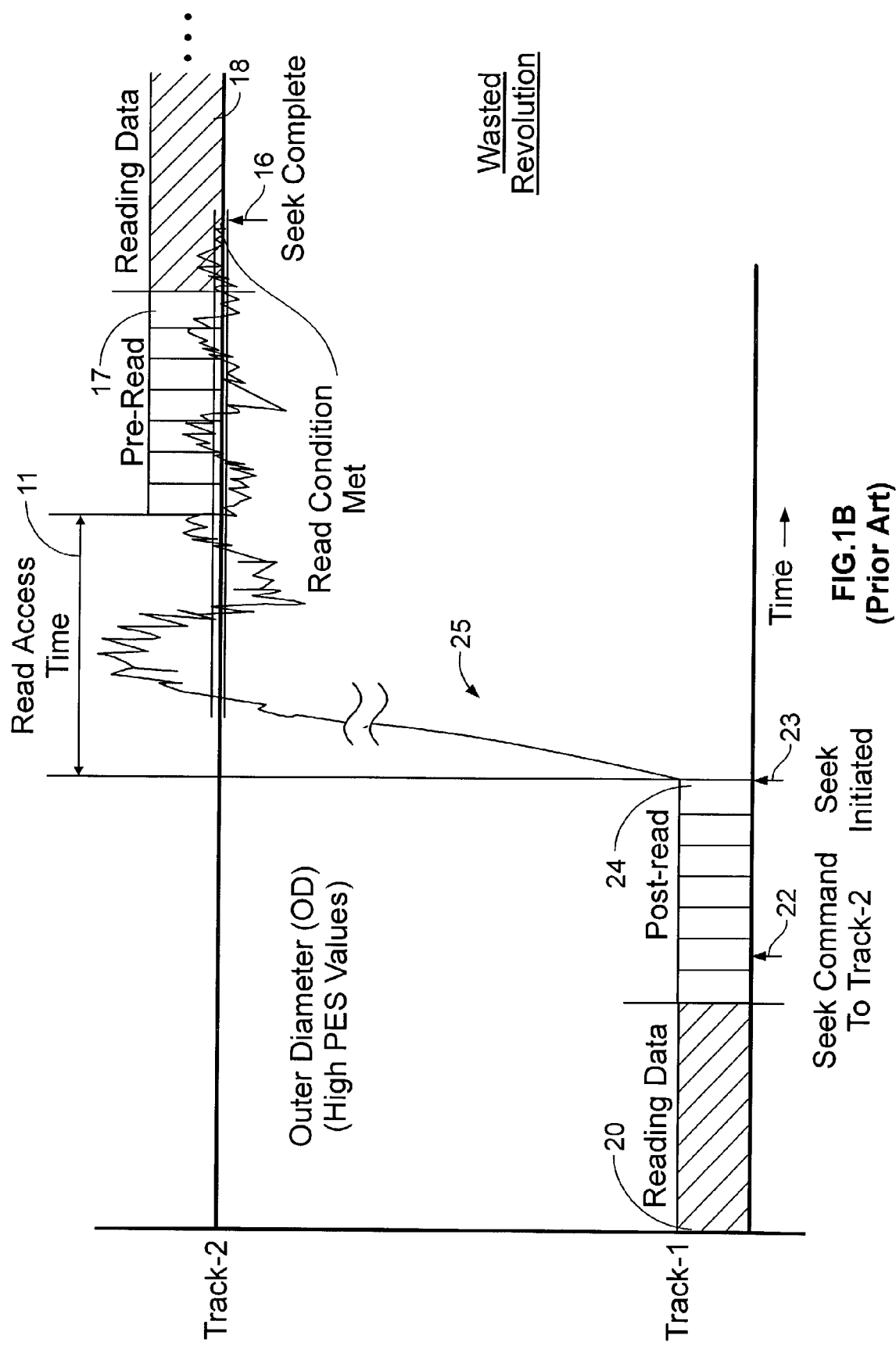
FIG. 1B is another example of a seek and settle operation for an RMSD with a read access time and a standard read caching algorithm.
Figure 2:
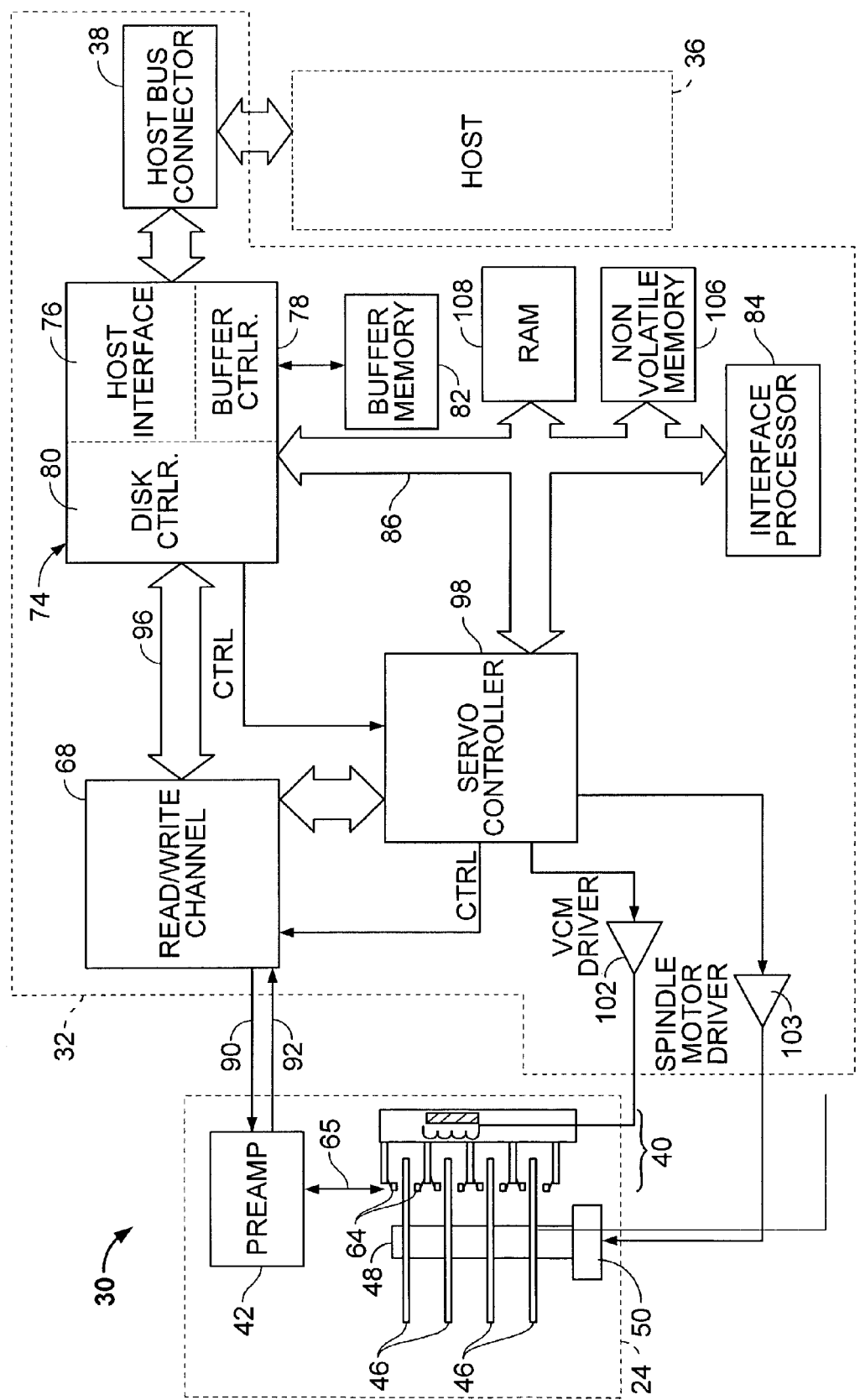
FIG. 2 shows a block diagram of a rotating media storage device (RMSD), such as a disk drive, in which the invention may be practiced.

FIG. 2 shows a block diagram of a rotating media storage device (RMSD), such as disk drive 30, in which the invention may be practiced. Disk drive 30 is connected to a host computer 36 via host bus connector 38 for the transfer of commands, status and data. One suitable standard for such connection is the Advance Technology Attachment (ATA) standard presently favored for desktop personal computers. Disk drive 30 comprises a Head/Disk Assembly, HDA 34, and a controller printed circuit board assembly, PCBA 32.

HDA 34 comprises: one or more disks 46 for data storage; a spindle motor 50 for rapidly spinning each disk 46 (four shown) on a spindle 48; and an actuator assembly 40 for moving a plurality of heads 64 in unison over each disk 46. The heads 64 are connected to a preamplifier 42 via a cable assembly 65 for reading and writing data on disks 46. Preamplifier 42 is connected to channel circuitry in controller PCBA 32 via read data line 92 and write data line 90.

Controller PCBA 32 comprises a read/write channel 68, servo controller 98, host interface and disk controller HIDC 74, voice coil motor driver VCM 102, spindle motor driver SMD 103, microprocessor 84, and several memory arrays—buffer or cache memory 82, RAM 108, and non-volatile memory 106.

Host initiated operations for reading and writing data in disk drive 30 are executed under control of microprocessor 84 connected to the controllers and memory arrays via a bus 86. Program code executed by microprocessor 84 is stored in non-volatile memory 106 and random access memory RAM 108. Program overlay code stored on reserved tracks of disks 46 may also be loaded into RAM 108 as required for execution. In particular, as described in detail below, microprocessor 84 under the control of a program or routine executes the method of the invention.

During disk read and write operations, data transferred by preamplifier 42 is encoded and decoded by read/write channel 68. During read operations, channel 68 decodes data into digital bits transferred on an NRZ bus 96 to HIDC 74. During write operations, HIDC provides digital data over the NRZ bus to channel 68 which encodes the data prior to its transmittal to preamplifier 42. Preferably, channel 68 employs PRML (partial response maximum likelihood) coding techniques, although the invention may be practiced with equal advantage using other coding processes.

HIDC 74 comprises a disk controller 80 for formatting and providing error detection and correction of disk data, a host interface controller 76 for responding to commands from host 36, and a buffer controller 78 for storing data which is transferred between disks 46 and host 36. Collectively the controllers in HIDC 74 provide automated functions which assist microprocessor 84 in controlling disk operations.

A servo controller 98 provides an interface between microprocessor 84 and actuator assembly 40 and spindle motor 50. Microprocessor 84 commands logic in servo controller 98 to position actuator 40 using a VCM driver 102 and to precisely control the rotation of spindle motor 50 with a spindle motor driver 103.

Preferably, disk drive 30 employs a sampled servo system in which equally spaced servo wedge sectors (sometimes termed "servo wedges") are recorded on each track of each disk 46. Data sectors are recorded in the intervals between servo sectors on each track. Servo sectors are sampled at regular intervals to provide servo position information to microprocessor 84. Servo sectors are received by channel 68, and are processed by servo controller 98 to provide position information to microprocessor 84 via bus 86.

The present invention optimizes data transfer rates to and from a disk by efficiently switching between a read operation on a first track of a disk 46 and a read operation on a second track of the disk 46 based on the radial position of the second track. As previously discussed, the disk drive 30 includes a moveable head 64, a cache memory 82 and a microprocessor 84 for controlling operations in the disk drive 30 including seek operations and read caching algorithms for read operations that include pre-read operations and post-read operations. The microprocessor 84 under the control of a program bins the radial position of the second track and estimates a read access time to the second track based on the binned radial position of the second track and the distance between the first track and the second track.

In one embodiment, binning a radial position of the second track includes grouping outer diameter track bands and inner diameter track bands. The inner and outer diameter track bands may be uniform or non-uniform. Preferably, the microprocessor 84 modifies a read caching algorithm based on the estimated read access time. For example, modifying the read caching algorithm can include adjusting the amount of post-read performed on the first track. In one example, the amount of post-read performed on the first track is decreased if the second track belongs to an outer diameter track band. On the other hand, the amount of post-read performed on the first track can be increased if the second track belongs to an inner diameter track band. It should be appreciated that many of the methods steps to be hereinafter described are implemented by the microprocessor 84 operating under the control of a program or routine.

Figure 3A:
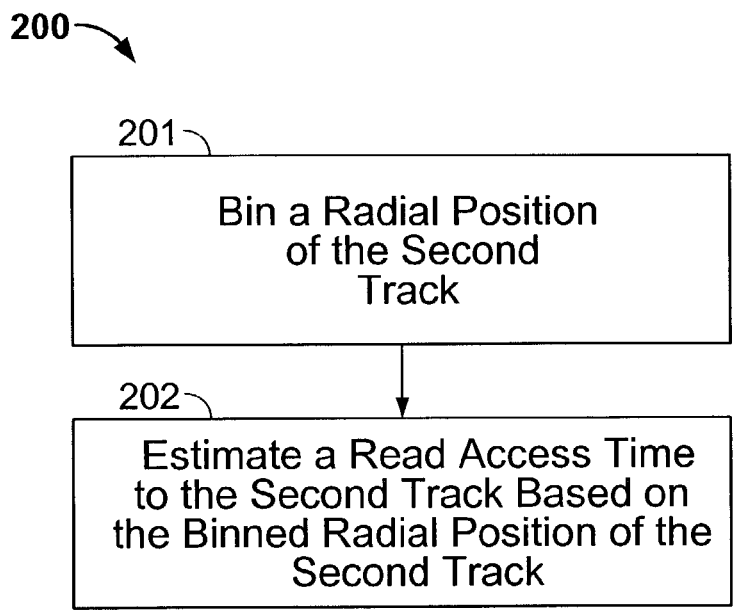
FIG. 3A is a flowchart of a method of the invention for efficiently switching between a first track and a second track based on the radial position of the second track.

Now turning to FIG. 3A, a flowchart of a method 200 of the invention for efficiently switching between a first track and a second track based on the radial position of the second track is illustrated. At step 201, the method bins a radial position of the second track that is being seeked to. The step of binning typically includes determining to which grouped track band the second track belongs based on its radial position (e.g. an outer diameter track band or an inner diameter track band). Next, at step 202, a read access time to the second track is estimated based on the binned radial position of the second track. As will now be discussed, oftentimes track are grouped together, such as into outer diameter track bands and inner diameter track bands.

Figure 3B:
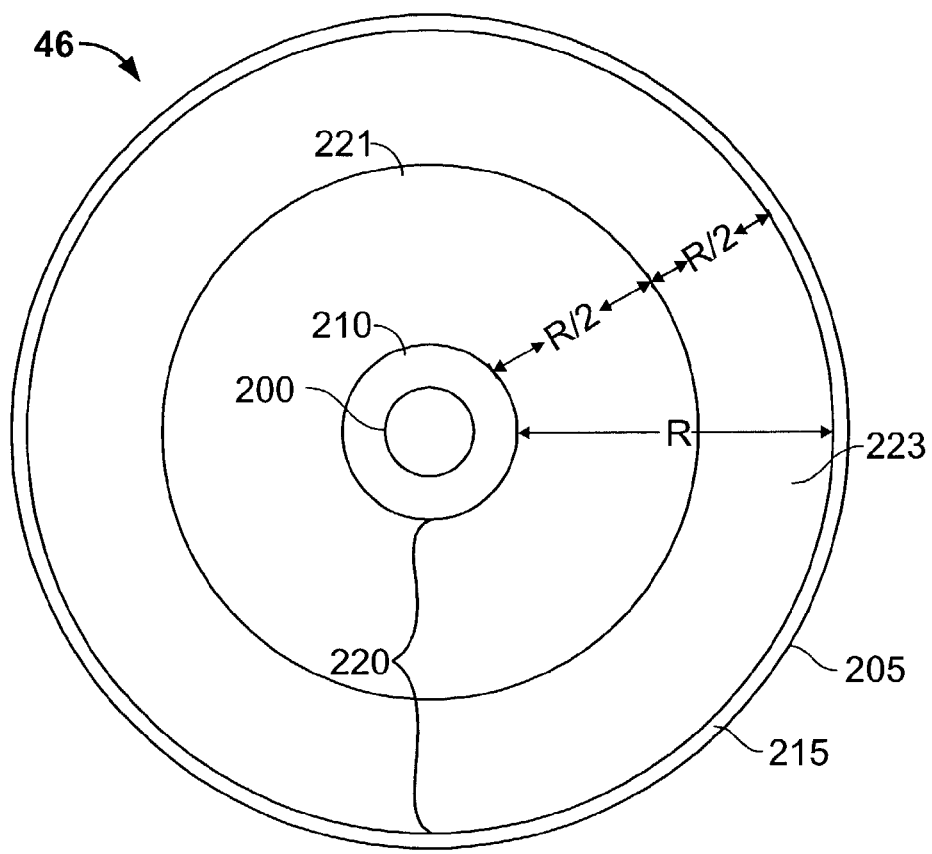
FIG. 3B is a diagram of a disk having tracks that are grouped into inner diameter track bands and outer diameter track bands.

Referring now to FIG. 3B, a diagram of a disk 46 showing tracks that are grouped into inner diameter track bands and outer diameter track bands is shown. As previously discussed, the disk 46 is mounted on a spindle motor. The storage medium, such as disk 46, includes an inner circumference 200 and an outer circumference 205. The disk 46 also has a portion 215 proximate the outer circumference 205 that is not used for recording. This portion typically has a radial width of about 2–3 mm. The disk 46 also comprises a portion 210 proximate the inner circumference 200 that is not used for recording, but may be used as a landing zone. The disk also includes magnetic storage portion 220 between the inner circumference 200 and the outer circumference 205. The magnetic-storage portion 220 has a radial width R between the portions 210 and the portion 215.

In this example, the magnetic-storage portion 220 is grouped such that an outer diameter track band 223 is proximate the outer circumference 205 and comprises about ½ the radial width (i.e. approximately R/2). The outer diameter track band comprises a first plurality of generally concentric servo tracks that are written at a first average servo track density. The magnetic-storage portion 220 also includes an inner diameter track band 221 proximate the inner circumference 200 comprising about ½ of the radial width (i.e. approximately R/2). The inner diameter track band 221 comprises a second plurality of generally concentric servo tracks that are written at a second average servo track density.

Although the foregoing describes the disk 46 as having two radial bands, e.g. and outer diameter track band 223 and an inner diameter track band 221, these are not physical bands on the medium of the disk. Further, the outer and inner diameter track bands are also not magnetically divided in any way on the disk. The outer and inner diameter track bands 223 and 221 are merely a way of grouping tracks into approximately equal one half sections in the magnetic-storage portion 220.

Figure 3C:
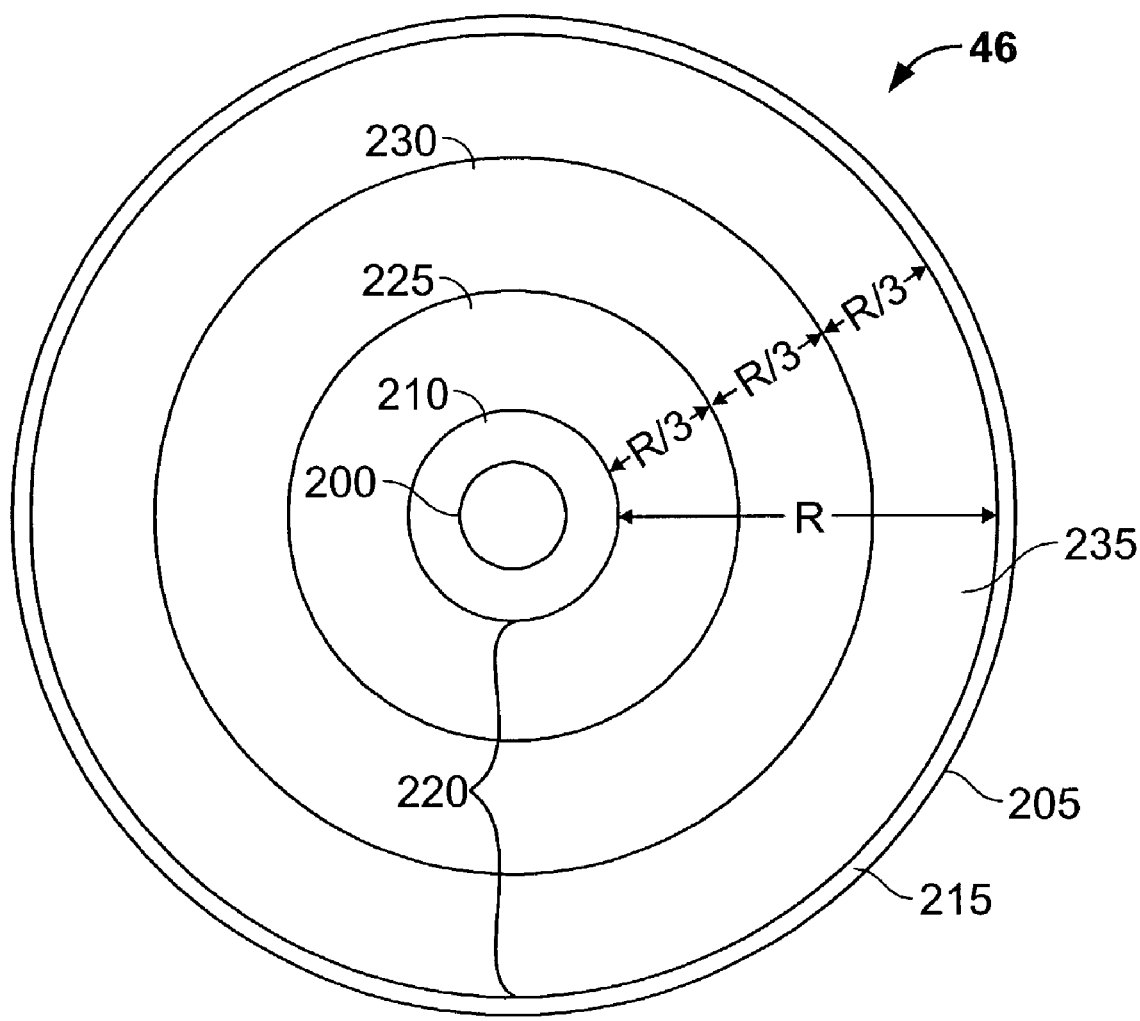
FIG. 3C is a diagram showing another example of the grouping of track bands.

FIG. 3C is a diagram showing another example of grouping radial track bands. Again, as previously discussed, the disk 46 includes an inner circumference 200 and outer circumference 205. The disk 46 also has a portion 215 proximate the outer circumference 205 that is not used for recording. This portion has a radial width of about 2–3 mm. The disk 46 also comprises a portion 210 proximate the inner circumference 200 that is not used for recording but which may be used as a landing zone. The disk 46 also includes a magnetic-storage portion 220 between the inner circumference 200 and the outer circumference 205. The magnetic-storage portion 220 has a radial width R between the portion 210 and the portion 215.

In this example, the magnetic-storage portion 220 includes a outer diameter track band 235 proximate the outer circumference 205 that comprises about ⅓ of the radial width (i.e. approximately R/3). The outer diameter track band 235 comprises a first plurality of generally concentric servo tracks that are written at a first average servo track density. The magnetic-storage portion 220 also includes an inner diameter track band 225 proximate the inner circumference 200 comprising about ⅓ the radial width (i.e. approximately R/3). The inner diameter track band 225 comprises a second plurality of generally concentric servo tracks that are written at a second average servo track density. The magnetic-storage portion also includes an intermediate diameter track band 230 that is between the outer diameter track band 235 and the inner diameter track band 225, and the that comprises about ⅓ the radial width (i.e. approximately R/3). The intermediate diameter track band 230 comprises a third plurality of generally concentric servo tracks that are written at a third average servo track density.

Although the foregoing describes the disk 46 as having three radial bands: outer diameter track band 235, intermediate diameter track band 230, and inner diameter track band 225; these are not physical bands on the medium of the disk 46. Further, the track bands are not magnetically divided in any way on the medium of the disk 46. The three track bands 225, 230, and 235 are merely a way of grouping tracks in approximately equal thirds in magnetic-storage portion 220.

It should further be appreciated that the outer, intermediate, and inner diameter track bands of both FIG. 3B and FIG. 3C may be uniform or non-uniform. Moreover, it should be appreciated that these previously described grouping of different diameter track bands is merely for illustrative purposes and that the media of disk 46 can be grouped into any of the different sized track bands.

Figure 3D:
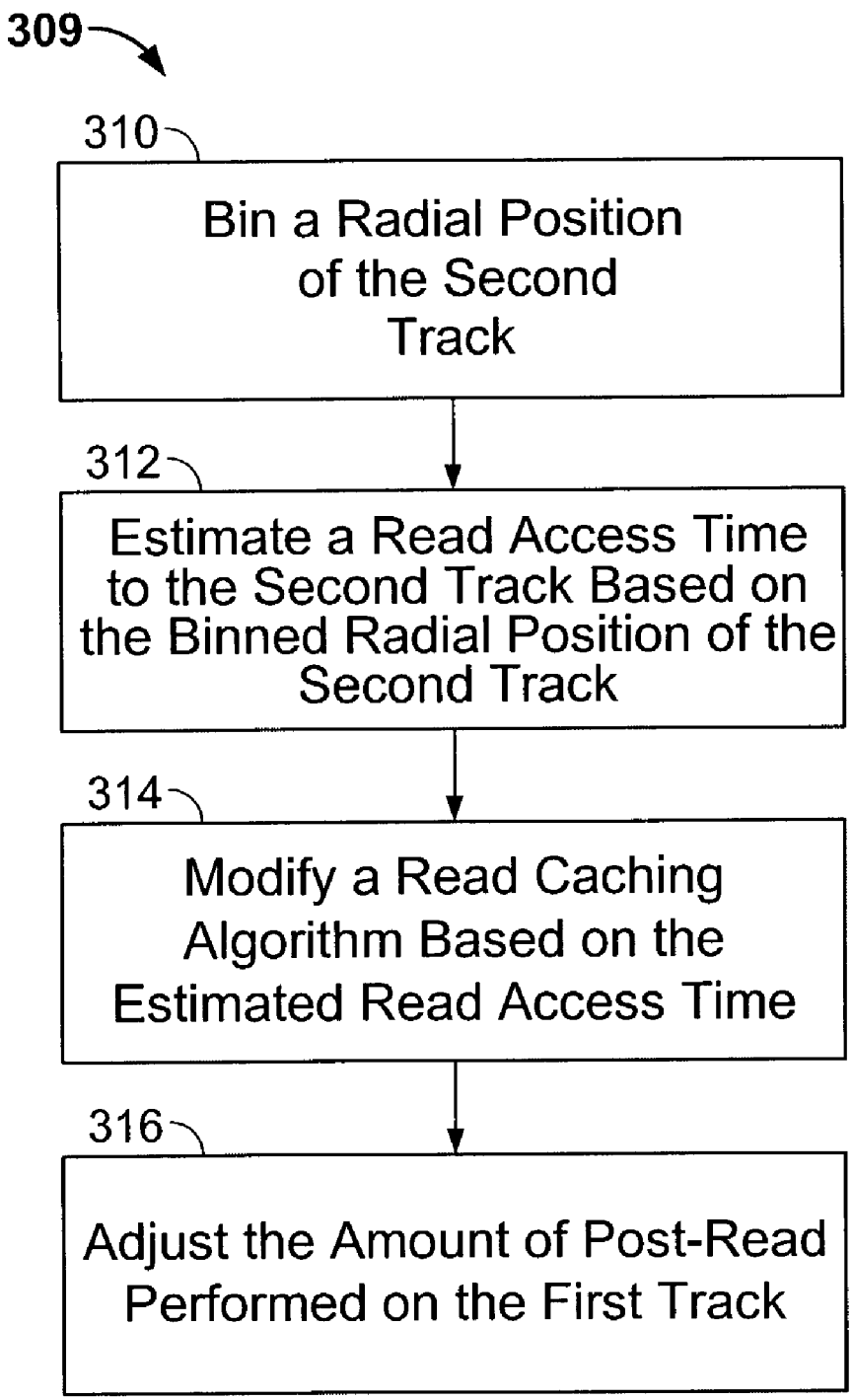
FIG. 3D is a flowchart of another embodiment of the method of the invention for efficiently switching between a first track and a second track based on the radial position of the second track.

Turning now to FIG. 3D, FIG. 3D is a flowchart of another embodiment of the method 309 of the invention for efficiently switching between a first track and a second track based on the radial position of the second track. At step 310, the method bins a radial position of the second track. As previously discussed in detail with reference to FIGS. 3A–3C binning a radial position of the second track includes determining which grouped track band the second track belongs to based on its radial position, such as in an outer diameter track band or an inner diameter track band. Next, at step 312, a read access time is estimated based on the binned radial position of the second track and the distance between the first track and the second track. At step 314, a read caching algorithm is modified based on the estimated read access time. Then, at step 316, the read caching algorithm is modified such that the amount of post-read performed on the first track is adjusted.

Figure 4:
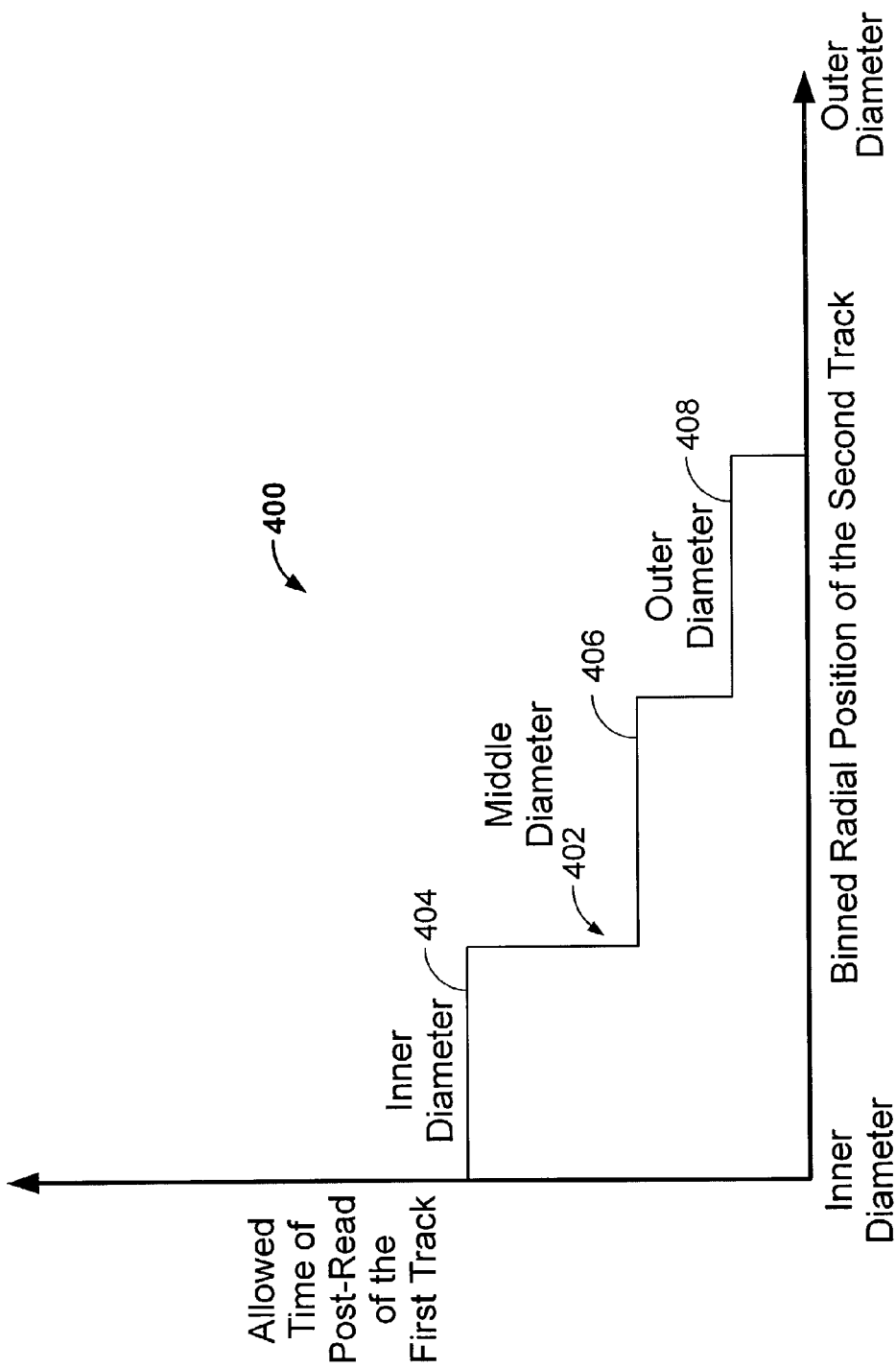
FIG. 4 is a diagram showing that the amount of post-read to be performed on the first track is inversely proportional to the binned radial position of the second track.

FIG. 4 illustrates that in one embodiment of the invention, the allowed amount of post-read time to be performed on the first track is inversely proportional to the binned radial position of the second track. The y-axis represents the allowed amount of post-read time to be performed on the first track and the x-axis represents the binned radial position of the second track. As seen in FIG. 4, line 402 shows the stepped inversely proportional relationship between the allowed amount of post-read time to be performed on the first track versus the binned radial position of the second track. Particularly, for grouped inner diameter track bands 404 a relatively large amount of post-read is performed on the first track, for grouped intermediate diameter track bands 406 an intermediate amount of post-read is performed on the first track, and lastly for grouped outer diameter track bands 408 a relatively small amount of post-read is performed on the first track. It should be appreciated that although this graph only illustrates the amount of post-read performed on the first track versus binned radial positions of the second track for grouped outer, middle, and inner diameter track bands (e.g. similar to FIG. 3C previously discussed) that this stepped inverse relationship holds true for other types of grouping of track bands.

Figure 5:
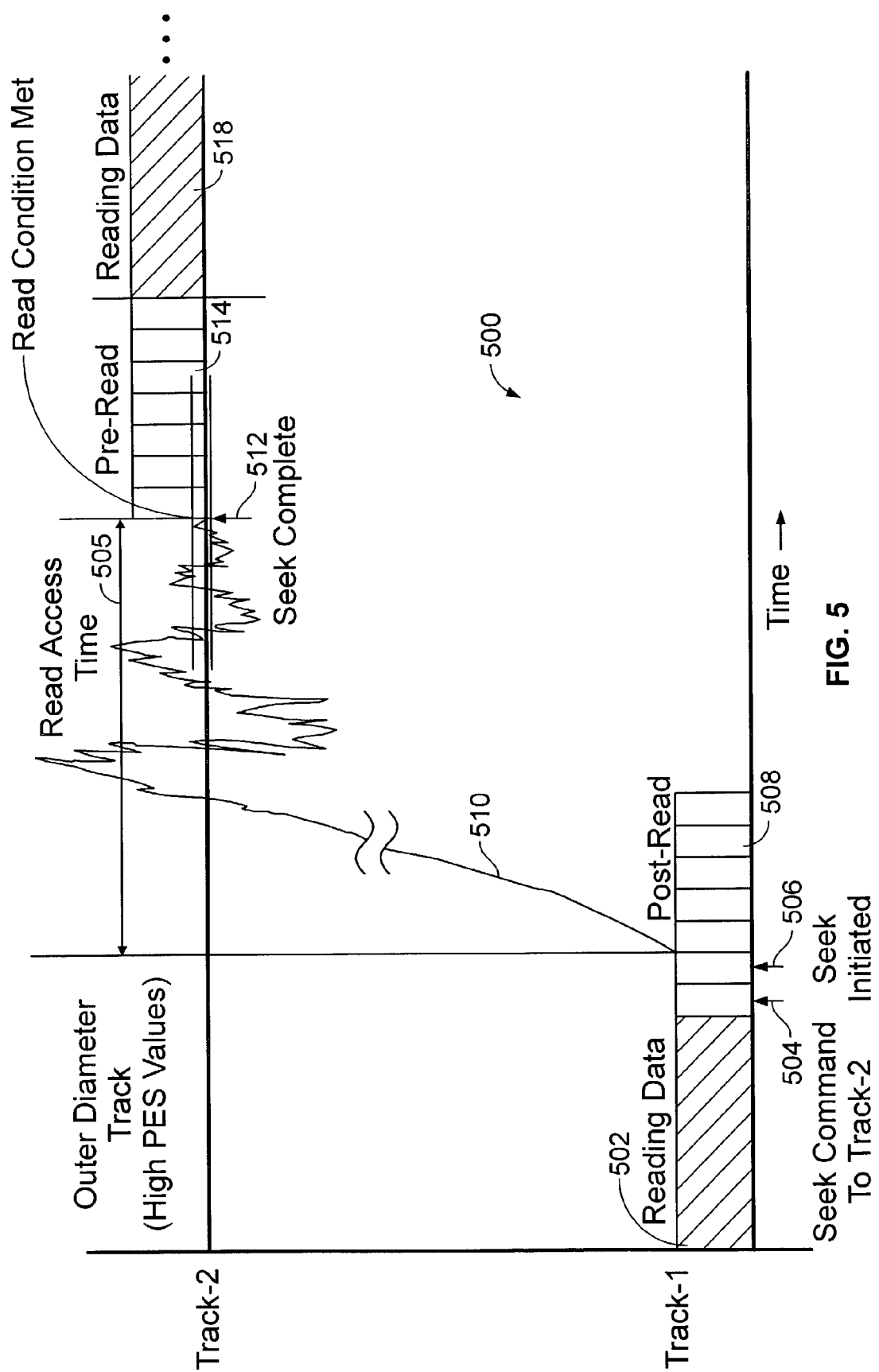
FIG. 5 is a diagram illustrating a modified read caching algorithm in which the amount of post-read performed on a first track is decreased when seeking to a second track that belongs to an outer diameter track band.

Specific examples of particular modifications to read caching algorithms will now be discussed with reference FIGS. 5–7. Turning now to FIG. 5, a diagram illustrating a modified read caching algorithm 500 in which the amount of post-read performed on a first track is decreased when seeking to a second track that belongs to an outer diameter track band is shown. Here, data 502 is read along Track-1 and a seek command to Track-2 to read data is received at point 504. Consequent to this event, a read access time 505 to the second track (i.e. Track-2) is estimated. In this case, the read access time to the second track is estimated based on the binned radial position of the second track belonging to an outer diameter track band, in addition to the standard calculation of estimating the read access time based on the absolute distance between the first track and the second track.

Particularly, since the binned radial position corresponds to an outer diameter track band, the read access time is increased. This is because, as previously discussed, when the head of the RMSD moves to an outer diameter track of a rotating disk there are sources present there that generate increased PES values (e.g. due to vibration) and as a result high PES values are present. Accordingly, this needs to be accounted for. This is accomplished by increasing the estimated read access time and correspondingly decreasing the amount of post-read performed.

In this case, based on the increased read access time, the read caching algorithm is modified such that the amount of post-read on the first track is decreased. Thus, as shown in FIG. 5, at point 506 a seek is initiated to the second track. Line 510 illustrates the head 64 of the disk drive 30 moving from Track-1 to Track-2. Particularly, line 510 illustrates that the head 64 encounters increased PES values while seeking and settling to Track-2, because Track-2 belongs to an outer diameter track band.

However, even though head 64 encounters increased PES values, since the read caching algorithm was modified to eliminate most of the post-read operation 508, a read condition is still met such that the seek operation is complete and an on-track condition is declared at point 512, before the pre-read 514. The modified read caching algorithm causes a pre-read 514 on Track-2 and then further proceeds to read the desired data 518. Alternatively, it should be appreciated that after an on-track condition is declared at point 512, a write operation can be performed instead of a read operation. By utilizing the modified read caching algorithm, which eliminates the majority of the post-read operation, the head 64 can still seek and settle to the second track even though the second track belongs to an outer diameter track band where the PES values are high; such that an additional disk rotation that degrades disk performance will not occur.

Figure 6:
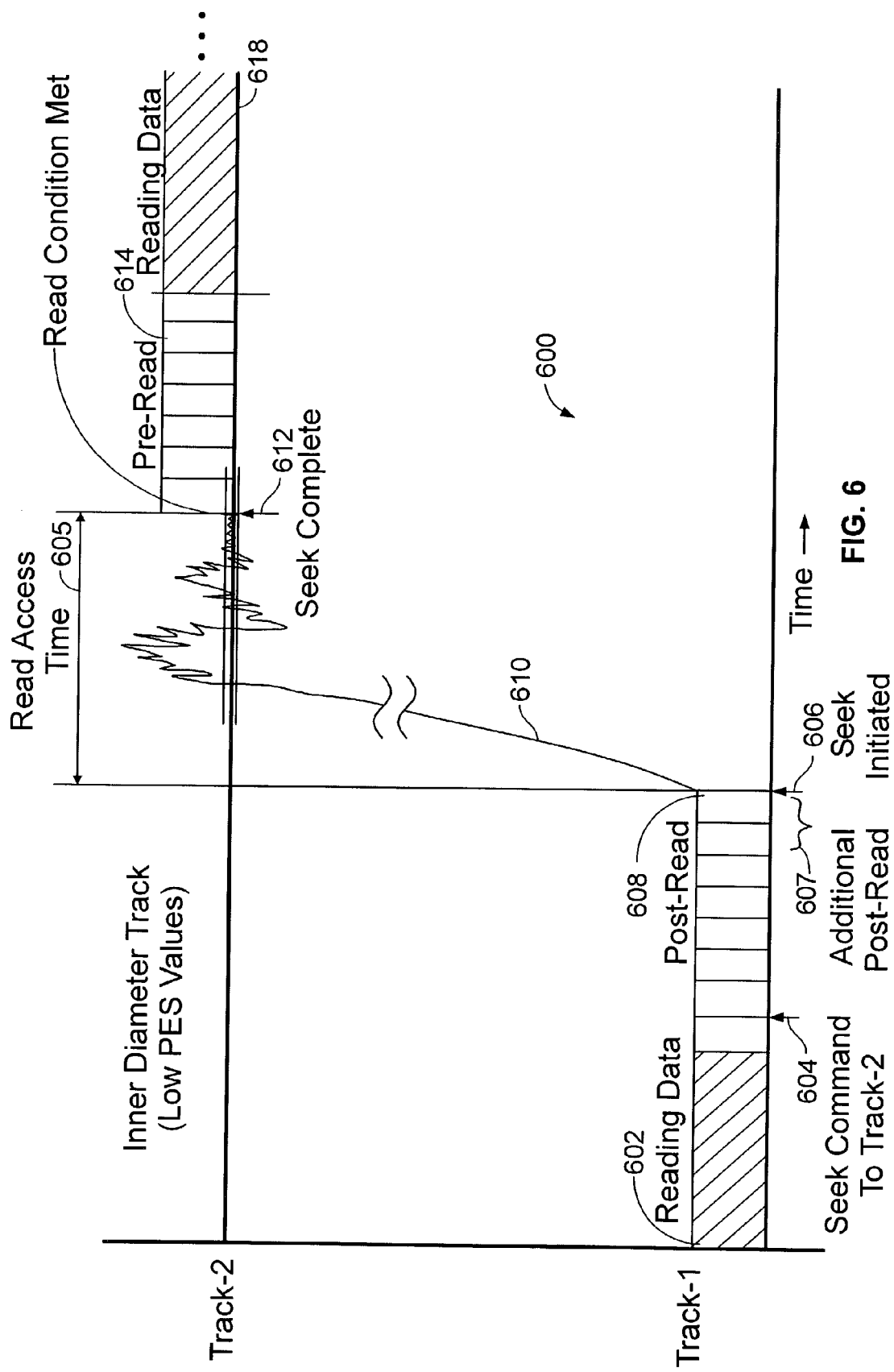
FIG. 6 is a diagram illustrating a modified read caching algorithm in which the amount of post-read performed on the first track is increased when seeking to a second track that belongs to an inner diameter track band.

Referring now to FIG. 6, FIG. 6 shows a diagram illustrating a modified read caching algorithm 600 in which the amount of post-read performed on the first track is increased when seeking to a second track that belongs to an inner diameter track band. Here, data 602 is read along Track-1 and a seek command to Track-2 to read data is received at point 604. Consequent to this event, a read access time 605 to the second track based on the binned radial position of the second track and the distance of the first track and the second track is estimated. In this case, the read access time is estimated in such a way as to adjust the post-read operation 608 of the first track to accomplish the maximum amount of post-read 608, while still being able to complete the seek and settle operation in a sufficient amount of time to perform a pre-read operation 614 on the second track. Particularly, because the radial position of the second track is binned as an inner diameter track band the estimated amount of read access time 605 is reduced. This is because, since the inner diameter track band is known to have lower levels of PES values associated with it, it is assumed that the seek and settle time will be less and thus a greater amount of post-read can be performed on the first track.

As shown in FIG. 6, after performing a post-read operation 608 including an additional amount of post-read 607 (i.e. due to the fact that the drive is seeking to an inner diameter track band), at point 606 a seek is initiated to the second track. Line 610 illustrated the head 64 of the disk drive 30 moving from Track-1 to Track-2. Even though the read caching algorithm was modified to perform additional post-read 607, above and beyond what would be the normal amount of post-read, a read condition is still met such that the seek operation is complete and an on-track condition is declared at point 612, before the pre-read 614. The modified read caching algorithm causes a pre-read 614 on Track-2 and then further proceeds to read the desired data 618. Alternatively, it should be appreciated that a write operation can be performed instead of a read operation. Thus, by utilizing the modified read caching algorithm, which allowed an additional amount of post-read operation 607, the head 64 can still seek and settle to the second track.

Figure 7:
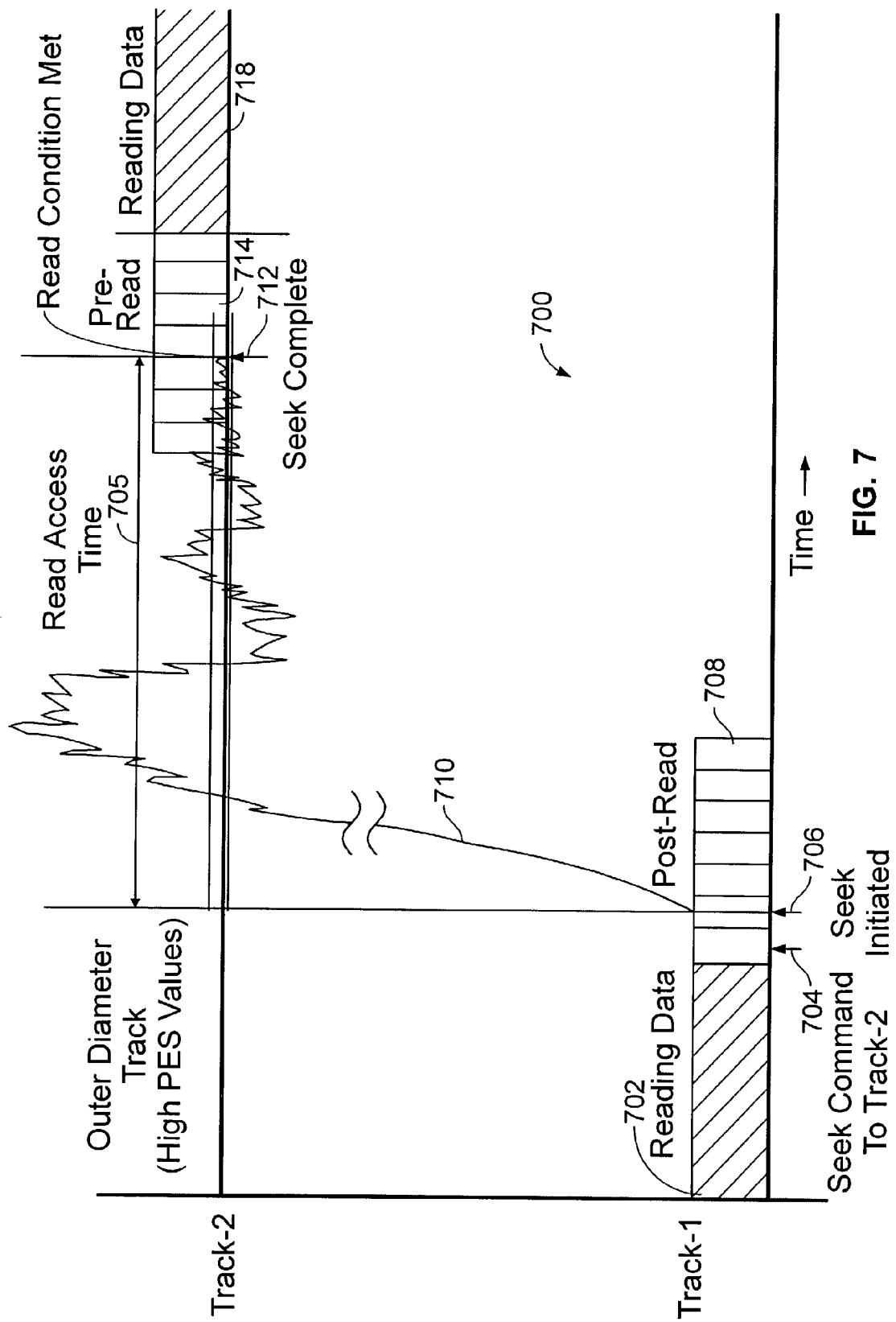
FIG. 7 is a diagram illustrating a modified read caching algorithm in which the amount of post-read performed on the first track is decreased and the amount of pre-read performed on the second track is also decreased, when seeking to a second track that belongs to an outer diameter track band.

Referring now to FIG. 7, FIG. 7 shows a diagram illustrating a modified read caching algorithm 700 in which the amount of post-read on the first track is decreased and the amount of pre-read on the second track is also decreased, when seeking to a second track that belongs to an outer diameter track band. Here, data 702 is read along Track-1 and a seek command to Track-2 to read data is received at point 704. Consequent to this event, a read access time 705 to the second track is estimated based on the binned radial position of the second track and the distance between the first and the second track. In this case, since the second track is binned in an outer diameter track band, the amount of read access time is increased because it is known that the outer diameter track band has sources present there that generate increased PES values (e.g. due to vibration) and as a result high PES values are associated with it. Therefore, extra read access time is allocated.

Accordingly, based on the increased estimated read access time, the modified read caching algorithm decreases the amount of post-read 708 on the first track and at point 706 seeks to the second track. Line 710 illustrates the head 64 of the disk drive 30 moving from Track-1 to Track-2. Particularly, line 710 illustrates that the head 64 is subject to relatively increased PES values while seeking an settling to Track-2, because Track-2 belongs to an outer diameter track band.

However, even though there are increased PES values associated with Track-2, because the read caching algorithm has decreased the amount of post-read 708 performed, and the amount pre-read 714 performed, a read condition is still met such that the seek operation is complete and an on-track condition is declared at point 712. The modified read caching algorithm causes the rest of the pre-read 714 on Track-2 to be read and then further proceeds to read the desired data 718. Alternatively, it should be appreciated that a write operation can be performed instead of a read operation. Thus, by utilizing the modified read caching algorithm 700, which decreases both the amount of post-read and pre-read performed, the head 64 can still seek and settle to the second track even when the second track belongs to an outer diameter track band and is subject to increased PES values. In this way, the head 64 can still seek and settle in the time without the disk drive 30 having to waste an additional disk rotation thereby degrading drive performance.

In summary the present invention may be regarded as a RMSD, e.g. a disk drive, that optimizes data transfer rates to and from a media even when switching to a second track that belongs to an outer diameter track band. The disk drive includes a moveable head, a cache memory and a microprocessor for controlling operations in the RMSD including seek operations and read caching algorithms for read operations that include pre-read operations and post-read operations. The microprocessor under the control of the program bins a radial position of the second track and estimates a read access time to the second track based on the binned radial position of the second track and the distance between the first track and the second track. Particularly, the microprocessor under the control of the program, based on the estimated read access time, modifies the read caching algorithm by adjusting the amount of post-read and/or pre-read performed such that the moveable head can still seek and settle to a second track belonging to an outer diameter track band (which, as previously discussed, inherently has sources present that cause increased PES values (e.g. due to vibration)), without having to perform an additional rotation. This advantageously increases data transfer rates to and from the media even when seeking to a second track that belongs to an outer diameter track band of the disk.

The process just discussed can be employed for disk drives with an embedded servo system. Numerous alternative methods for RMSDs with similar or other media format characteristics can be employed by those skilled in the art to use the invention with equal advantage to modify a read caching algorithm in order to optimize data transfer rates to and from the media. Further, although the embodiments have been described in the context of a disk drive with embedded servo sectors, the invention can be employed in many different types of RMSDs having a head actuator scanning the media.

The invention claimed is:

1. In a rotating media storage device (RMSD) connectable to a host computer, the RMSD having a disk including at least a first track and a second track, a moveable head, a cache memory and a microprocessor for controlling operations in the RMSD including seek operations and read caching algorithms for read operations that include pre-read operations and post-read operations, a method of efficiently switching between a read operation on the first track and a read operation on the second track, the method comprising the steps of:

a. binning a radial position of the second track;

b. estimating a read access time to the second track based on the binned radial position of the second track and the distance between the first track and the second track; and c. modifying a read caching algorithm based on the estimated read access time.

2. The method of claim 1, wherein binning comprises grouping outer diameter track bands and inner diameter track bands.

3. The method of claim 2, wherein the outer diameter track bands and the inner diameter track bands are uniform.

4. The method of claim 2, wherein the outer diameter track bands and the inner diameter track bands are non-uniform.

5. The method of claim 1, wherein modifying the read caching algorithm comprises adjusting the amount of post-read performed on the first track.

6. The method of claim 5, wherein the amount of post-read performed on the first track is decreased if the second track belongs to an outer diameter track band.

7. The method of claim 5, wherein the amount of post-read performed on the first track is increased if the second track belongs to an inner diameter track band.

8. The method of claim 5, wherein the amount of post-read performed on the first track is inversely proportional to the binned radial position of the second track.

9. The method of claim 1, wherein modifying the read caching algorithm comprises adjusting at least one of the amount of post-read performed on the first track or the amount of pre-read performed on the second track.

10. A rotating media storage device (RMSD) connectable to a host computer, the RMSD comprising:
  a disk including at least a first track and a second track;
  a moveable head;
  a cache memory; and
  a microprocessor for controlling operations in the RMSD including seek operations and read caching algorithms for read operations that include pre-read operations and post-read operations, the microprocessor under the control of a program to,
  a. bin a radial position of the second track;
  b. estimate a read access time to the second track based on the binned radial position of the second track and the distance between the first track and the second track; and
  c. modifying a read caching algorithm based on the estimated read access time.

11. The RMSD of claim 10, wherein binning a radial position of the second track comprises grouping outer diameter track bands and inner diameter track bands.

12. The RMSD of claim 11, wherein the outer diameter track bands and the inner diameter track bands are uniform.

13. The RMSD of claim 11, wherein the outer diameter track bands and the inner diameter track bands are non-uniform.

14. The RMSD of claim 10, wherein modifying the read caching algorithm comprises adjusting the amount of post-read performed on the first track.

15. The RMSD of claim 14, wherein the amount of post-read performed on the first track is decreased if the second track belongs to an outer diameter track band.

16. The RMSD of claim 14, wherein the amount of post-read performed on the first track is increased if the second track belongs to an inner diameter track band.

17. The RMSD of claim 14, wherein the amount of post-read performed on the first track is inversely proportional to the binned radial position of the second track.

18. The RMSD of claim 10, wherein modifying the read caching algorithm comprises adjusting at least one of the amount of post-read performed on the first track or the amount of pre-read performed on the second track.

19. A computer system comprising a host computer and a rotating media storage device (RMSD), the RMSD further comprising:
  a disk including at least a first track and a second track;
  a moveable head;
  a cache memory; and
  a microprocessor for controlling operations in the RMSD including seek operations and read caching algorithms for read operations that include pre-read operations and post-read operations, the microprocessor under the control of a program to,
  a. bin a radial position of the second track; and
  b. estimate a read access time to the second track based on the binned radial position of the second track and the distance between the first track and the second track; and
  c. modifying a read caching algorithm based on the estimated read access time.

20. The computer system of claim 19, wherein binning a radial position of the second track comprises grouping outer diameter track bands and inner diameter track bands.

21. The computer system of claim 20, wherein the outer diameter track bands and the inner diameter track bands are uniform.

22. The computer system of claim 20, wherein the outer diameter track bands and the inner diameter track bands are non-uniform.

23. The computer system of claim 19, wherein modifying the read caching algorithm comprises adjusting the amount of post-read performed on the first track.

24. The computer system of claim 23, wherein the amount of post-read performed on the first track is decreased if the second track belongs to an outer diameter track band.

25. The computer system of claim 23, wherein the amount of post-read performed on the first track is increased if the second track belongs to an inner diameter track band.

26. The computer system of claim 23, wherein the amount of post-read performed on the first track is inversely proportional to the binned radial position of the second track.

27. The computer system of claim 19, wherein modifying the read caching algorithm comprises adjusting at least one of the amount of post-read performed on the first track or the amount of pre-read performed on the second track.

* * * * *